Patented Mar. 26, 1940

2,194,925

UNITED STATES PATENT OFFICE 2,194,925

PRIMARY ARYLAMINES AND THE MANUFACTURE THEREOF

Herbert W. Daudt, Wilmington, Del., and Harold E. Woodward, Penns Grove, N. J., assignors to E. I. du Pont de Nemours & Company, Wilmington, Del., a corporation of Delaware No Drawing. Application December 31, 1937, Serial No. 182,801

10 Claims. (Cl. 260—575)

This invention relates to new amino-benzotrifluoride compounds which are useful as bases in the manufacture of azo compounds, as dyes and for other purposes; and especially to dinitroamino-benzotrifluoride compounds and to processes of making the same.

It is desirable to provide new diazotizable arylamines which can be coupled to azo dye coupling components to manufacture dyes which have good affinity for textile fibres, and especially for cellulose esters, ethers and similar materials. A further need is to provide new dyes for cellulose esters and ethers which give deep shades of violets, greens and blues, and have good affinity for the fibre. Certain new dinitro-amino-benzotrifluorides have been discovered which can be diazotized and coupled to azo dye coupling components to provide improved dyes.

It is among the objects of this invention to provide new dinitro-amino-benzotrifluoride compounds and processes for manufacturing the same. Another object of the invention is to provide new colored compounds. Another object of the invention is to provide new dyes and intermediates for the manufacture of dyes. Another object is to provide diazotizable dinitro-amino-benzotrifluoride compounds which can be used as bases in the manufacture of azo dyes. Still other objects of the invention will be apparent from the following description.

The objects of the invention are attained in general by ammonolyzing dinitro-halo-benzotrifluorides under suitable conditions so as to displace a halogen with the primary amino group, and then separating the ammonolyzed product from the reaction mixture by suitable means. By ammonolysis is meant the treatment of the starting compound with ammonia in order to introduce the primary amino group.

The invention will be more fully set forth in the following more detailed description which includes examples that are given as illustrative embodiments of the invention and not as limitations thereof.

Example 1

50 parts of 3,5-di-nitro-2-chloro-benzotrifluoride were dissolved in 1,000 parts of anhydrous ether. A stream of ammonia gas was slowly passed into the solution for about 12 hours and the temperature of the solution was held at 25°–28° C. Care was taken to prevent undue losses of the solvent by avoiding the addition of excessive amounts of ammonia gas. Compensations were made for solvent losses by occasional additions of ether.

An insoluble white residue which had formed was removed by filtration. Its weight was about 18% of that of the 3,5-di-nitro-2-chloro-benzotrifluoride used, and it was composed mainly of ammonium chloride.

The yellow colored filtered solution was evaporated to dryness. From this residue yellow crystals were produced which upon purification and recrystallization from a solvent melted in the range 111°–112° C. The crystalline product consisted essentially of 3,5-di-nitro-2-amino-benzotrifluoride which is represented by the formula

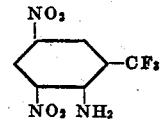

The product is insoluble in water and soluble in most organic solvents, such as ethyl alcohol, chloroform, benzene and its homologues, acetic acid, pyridine and acetone.

The above product was dispersed in water and used for the dyeing of acetate silk. Dyeings of greenish yellow shades were obtained.

The above crystalline product was diazotized in sulfuric acid solution of 96% concentration by means of sodium nitrite. The diazotized solution produced colored products of coupling when added to solutions of various azo coupling components, namely beta-naphthol, 1,5-amino-naphthol, N-hydroxy-ethyl-aniline and H-acid.

The 3,5-dinitro-2-chloro-benzotrifluoride had a melting point in the range 57° to 59° C. It is obtainable by the dinitration of o-chloro-benzotrifluoride.

Example 2

A solution of 3,5-di-nitro-2-chloro-benzotrifluoride like that used in Example 1 was prepared and stirred in a closed apparatus. Ammonia gas was added above the surface of the liquid, whilst maintaining the temperature of 25° to 28° C. The pressure at first was about atmospheric pressure, but during the later stages of the reaction it was maintained at about 15 to 30 lbs. per sq. in. above atmospheric pressure by adding ammonia gas under pressure. The reaction was continued until a test sample of the charge showed that the amidation reaction was essentially complete. The latter condition was indicated by the melting range of the residue which remained upon the evaporation of the filtered sample. Preferably, the reaction was continued until the residue melted between 107° C. and 112° C.

The reaction mass was filtered and the filtrate was treated similarly to that described in Example 1. The product was similar to that of Example 1.

Similar results were obtained by using an equivalent amount of 3,5-di-nitro-2-bromo-benzotrifluoride instead of 3,5-di-nitro-2-chloro-benzotrifluoride in the process of Example 2.

*Example 3*

A solution of 75 parts of a mixture of 3,5-di-nitro-2-chloro-benzotrifluoride and 25 parts of mono-nitro-2-chloro-benzotrifluoride which has been obtained by the nitration of ortho-chloro-benzotrifluoride was dissolved in ether and amidated under the conditions described in Example 1. The product was subjected to crystallization from ether. 3,5-di-nitro-2-amino-benzotrifluoride having a melting range 111°–112° C. was obtained. There was no apparent amidation of the mono-nitro-2-chloro-benzotrifluoride at this temperature.

The above product was dispersed in water with soap and used for the dyeing of acetate silk. Dyeings of greenish yellow shades were obtained.

*Example 4*

The process of Example 1 was carried out in a reaction medium composed of toluene instead of ether and similar results were obtained.

*Example 5*

The process of Example 2 was carried out by using an equivalent amount of 3,5-di-nitro-4-chloro-benzotrifluoride instead of 3,5-di-nitro-2-chloro-benzotrifluoride and 3,5-di-nitro-4-amino-benzotrifluoride was obtained.

The method of ammonolyzing described in the above examples may be applied to any di-nitro-halo-benzotrifluoride in which halogen is chlorine, bromine, iodine or fluorine, one nitro group is in the position 5 or 6 to halogen, trifluoromethyl is in the position 2 or 4 to halogen, and the other nitro group is in the position 2 to halogen when trifluoromethyl is in the 4 position to halogen and is in the 4 position to halogen when trifluoromethyl is in the 2 position. The preferred compounds are those in which the nitro groups and trifluoromethyl are in any of the positions 2, 4 or 6 to halogen, and one $CF_3$ is ortho or para to halogen; thus providing as the preferred embodiment amino-benzene compounds having the negative groups nitro and trifluoromethyl in positions 2, 4 and 6 to amino, one trifluoromethyl being ortho or para to amino. In the described compounds either or both of the other positions of the benzene ring may be unsubstituted or they may be additionally substituted by alkoxy and trifluoromethyl. Alkoxy refers to the ether groups of aliphatic hydrocarbons, such as methyl, ethyl, propyl, butyl and even longer, straight and branched chain aliphatic hydrocarbons.

The reaction is not necessarily conducted in the presence of a solvent. Ammonia gas may be added to the di-nitro-halo-benzotrifluoride which is in a finely divided solid form or which is maintained in liquid or fused condition. However, the use of a solvent is, in general, preferred.

The reaction medium or diluent is not necessarily composed of ether. Any non-aqueous solvent which is inert to the reacting components and the product can be used. As other examples of such media methyl alcohol, ethyl alcohol, chloroform, benzene, toluene, and xylene are mentioned, but other solvents which are non-reactive toward the reactants and the product can be used. Catalysts, such as copper salts can be used to advantage when it is desired to ammonolyze at lower temperatures and pressures than would be required to carry out the ammonolysis without the catalyst.

The temperature of the reaction mixture can be varied over a wide range, the higher temperatures giving more rapid ammonolyses. Temperatures even lower or higher than about 10° to about 150° C. can be used when only dinitrochloro compounds are present to be ammonolyzed, but when mono-nitro-chloro compounds are present the temperature should be below about 100° C. unless ammonolysis of the mono-nitro compound is desired. Temperatures of about 20° C. to about 40° C. give sufficiently rapid reactions under most all circumstances and are generally preferred.

The reaction can be carried on satisfactorily at ordinary atmospheric pressures in open or closed containers or at superatmospheric pressures. Superatmospheric pressures are advantageous when ammonia gas is used as the ammonolyzing agent, when low boiling reaction media are used or when the reaction is carried out at relatively high temperatures. As compared to atmospheric pressure the reaction is in general accelerated at elevated pressures, other conditions being the same.

When the compounds of the invention are diazotized as for example with sodium nitrite in sulphuric acid medium, the diazotized products readily couple to azo coupling components and they are valuable as diazo compounds and as intermediates for azo dyes. The coupled products are colored compounds some of which are valuable colors, particularly for dyeing cellulose esters and ethers, such as acetate silk. The compounds of the invention can be used in the preparation of azo colors some of them ranging through violets, blues and greens. Among them are dyes having excellent affinity for the cellulose esters and ethers. As compared with other negatively di-nitro substituted anilines, such as 2-4-dinitro-aniline and 2-4-dinitro-6-chloro-aniline, the azo dyes produced with the compounds of the invention give in general deeper shades, and they are more stable to alkalis, such as sodium carbonate than azo dyes made from 2-4-6-trinitro-aniline.

Since from the foregoing description of the invention it will be apparent to those skilled in the art that various other embodiments of the invention may be made without departing from the spirit and scope thereof, it is to be understood that no limitations are intended except those which are specifically recited in the annexed claims or are imposed by the prior art.

We claim:
1. A compound represented by the formula

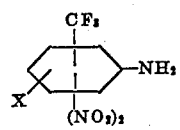

in which X is at least one of the group consisting of hydrogen, alkoxy and trifluoromethyl, one nitro is in one of the positions 5 and 6 to amino, trifluoromethyl is in one of the positions 2 and 4 to amino, and the other nitro is in the position 2 to amino when trifluoromethyl is in the 4 position and is in the 4 position to amino when trifluoromethyl is in the 2 position.

2. A compound represented by the formula

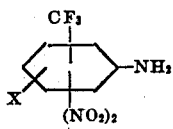

in which trifluoromethyl is in one of the positions ortho and para to amino, the nitro and trifluoromethyl groups are in positions 2, 4 and 6 to amino, and X is at least one of the group consisting of hydrogen, alkoxy and trifluoromethyl.

3. A compound represented by the formula

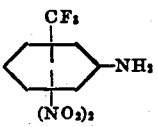

in which trifluoromethyl is in one of the positions ortho and para to amino, and the nitro and trifluoromethyl groups are in any of the positions 2, 4 and 6 to amino.

4. 3-5-dinitro-2-amino-benzotrifluoride.
5. 3-5-dinitro-4-amino-benzotrifluoride.
6. The process which comprises adding ammonia to a compound represented by the formula

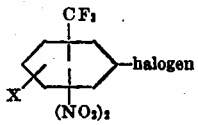

in which X is at least one of the group consisting of hydrogen, alkoxy and trifluoromethyl, one nitro is in one of the positions 5 and 6 to halogen, $CF_3$ is in one of the positions 2 and 4 to halogen, and the other nitro is in the position 2 to halogen when $CF_3$ is in the 4 position and is in the 4 position to halogen when $CF_3$ is in the 2 position, said ammonia being added until halogen is displaced by amino.

7. The process which comprises passing ammonia into a reaction medium which contains a compound represented by the formula

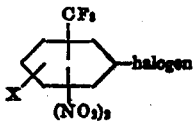

in which X represents at least one of the group consisting of hydrogen, alkoxy and trifluoromethyl, $CF_3$ is in one of the positions ortho and para to halogen, and the nitro and $CF_3$ groups are in positions 2, 4 and 6 to halogen, said medium being carried at temperatures between 10° and 150° C. until halogen is displaced by amino, said reaction medium being a non-aqueous organic solvent which is non-reactive toward said reactants.

8. The process which comprises passing ammonia into a reaction medium which contains a compound represented by the formula

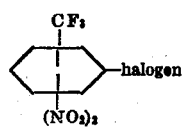

in which trifluoromethyl is in one of the positions ortho and para to halogen and the nitro and trifluoromethyl groups are in positions 2, 4 and 6 to amino, said medium being carried at temperatures between 10° and 150° C. until halogen is displaced by amino, said reaction medium being a non-aqueous organic solvent which is non-reactive toward said reactants.

9. The process which comprises passing ammonia into a reaction medium which contains in solution at least one of the group consisting of 3-5-dinitro-4-chloro-benzotrifluoride and 3-5-dinitro-2-chloro-benzotrifluoride until chloro is displaced by amino, said reaction being carried out at about 10° to about 100° C., said reaction medium being a non-aqueous organic solvent which is non-reactive toward said reactants.

10. The process which comprises passing ammonia into a reaction medium which contains in solution at least one of the group consisting of 3-5-dinitro-4-chloro-benzotrifluoride and 3-5-dinitro-2-chloro-benzotrifluoride at about 20° to about 40° C. until chloro is displaced by amino, said reaction medium being a non-aqueous organic solvent for said benzotrifluoride and chemically non-reactive toward said reacting compounds and the products of the reaction.

HERBERT W. DAUDT.
HAROLD E. WOODWARD.